US011669373B2

(12) United States Patent
Mittermeier

(10) Patent No.: US 11,669,373 B2
(45) Date of Patent: Jun. 6, 2023

(54) SYSTEM AND METHOD FOR FINDING AND IDENTIFYING COMPUTER NODES IN A NETWORK

(71) Applicant: Siemens Aktiengesellschaft, Munich (DE)

(72) Inventor: Ludwig Andreas Mittermeier, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/435,815

(22) PCT Filed: Feb. 26, 2020

(86) PCT No.: PCT/EP2020/054978
§ 371 (c)(1),
(2) Date: Sep. 2, 2021

(87) PCT Pub. No.: WO2020/178091
PCT Pub. Date: Sep. 10, 2020

(65) Prior Publication Data
US 2022/0091887 A1    Mar. 24, 2022

(30) Foreign Application Priority Data
Mar. 4, 2019    (EP) .................................... 19160453

(51) Int. Cl.
*G06F 9/50*    (2006.01)
*G06F 9/48*    (2006.01)
(Continued)

(52) U.S. Cl.
CPC ............ *G06F 9/505* (2013.01); *G06F 9/4881* (2013.01); *G06F 9/5072* (2013.01); *G06F 11/3006* (2013.01); *G06F 11/3433* (2013.01)

(58) Field of Classification Search
CPC ...... G06F 9/505; G06F 9/4881; G06F 9/5072; G06F 11/3006; G06F 11/3433
See application file for complete search history.

(56) References Cited

U.S. PATENT DOCUMENTS

2010/0241845 A1* 9/2010 Alonso .............. H04N 21/4788
715/753
2014/0196054 A1* 7/2014 Brochard ................ G06F 9/505
718/105

(Continued)

OTHER PUBLICATIONS

PCT International Search Report and Written Opinion of International Searching Authority dated Apr. 24, 2020 corresponding to PCT International Application No. PCT/EP2020/054978.

*Primary Examiner* — Sisley N Kim
(74) *Attorney, Agent, or Firm* — Lempia Summerfield Katz LLC

(57) ABSTRACT

A system for finding and identifying computer nodes in a network includes a network having multiple computer nodes and a planning module. The computer nodes are connected to one another by communication connections and are configured to perform a workload of one or more software application(s). The planning module includes at least one probe having a test code and is configured to send the probe with the test code to the computer nodes to test the properties of the computer nodes with respect of their ability to perform a specific workload of at least one software application. The planning module is configured to take the test results as a basis for selecting one or more computer nodes for performing the workload of at least one software application, and to start the performance of the workload of the at least one software application on the selected computer node.

14 Claims, 2 Drawing Sheets

(51) Int. Cl.
*G06F 11/30* (2006.01)
*G06F 11/34* (2006.01)

(56) References Cited

U.S. PATENT DOCUMENTS

| | | | |
|---|---|---|---|
| 2015/0025818 A1* | 1/2015 | Das | H04W 24/10 |
| | | | 702/58 |
| 2015/0032752 A1* | 1/2015 | Greifeneder | G06F 16/285 |
| | | | 707/738 |
| 2016/0191407 A1* | 6/2016 | Dvorkin | G06F 9/5077 |
| | | | 709/226 |
| 2018/0129495 A1* | 5/2018 | Whitcomb | G06F 8/71 |
| 2019/0079850 A1* | 3/2019 | Zhang | G06F 11/3616 |

* cited by examiner

SYSTEM AND METHOD FOR FINDING AND IDENTIFYING COMPUTER NODES IN A NETWORK

The present patent document is a § 371 nationalization of PCT Application Serial No. PCT/EP2020/054978, filed Feb. 26, 2020, designating the United States, which is hereby incorporated by reference, and this patent document also claims the benefit of European Patent Application No. 19160453.7, filed Mar. 4, 2019, which is also hereby incorporated by reference.

TECHNICAL FIELD

The disclosure relates to a system and to a method for finding and identifying computing nodes in a network.

BACKGROUND

Fog computing or fog networking, also referred to as fogging, is an architecture that uses edge devices in order to execute a considerable portion of the computations, storage, and communication locally and via the Internet backbone. Both cloud computing and fog computing offer end users and industrial users storage space, applications, and data. However, fog computing is closer to the end users and has a larger geographical distribution.

Fog computing includes distributing the communication, computation, and storage resources and services among or in the vicinity of devices and systems controlled by end users. Fog computing is not a replacement for cloud computing, but rather may be an addition thereto.

In fog/edge computing environments, computer workloads are distributed among suitable computing nodes on which they are executed. Examples of applications are, in the automotive sector, (e.g., driver assistance systems and computer systems for autonomous driving), in the medical sector, (e.g., a large number of diagnostic instruments in hospitals and in doctors' surgeries), and in industrial production, (e.g., assembly lines and manufacturing machines such as CNC machines).

However, a problem may arise in identifying and in finding one or more suitable computing nodes for a particular application, because the computing nodes have different properties, such as different processors and storage capacities.

At present, suitable computing nodes are identified by virtue of developers and operating staff manually defining the properties of the computing nodes and the identifiers of the workload. A processing system identifies suitable computing nodes for a given workload based on the properties of the computing nodes, with either a subset or the entire set of properties and capabilities of the computing nodes being identified. If a computing node has been found for a computing task, this computing node is also used. However, there is no check as to whether potentially more suitable computing nodes are available in order to optimize the utilization of the entire network or computing cluster and/or to achieve better or faster processing for a respective workload.

U.S. Patent Application Publication No. 2014/0196054 A1 describes a method for outputting a command to execute shortened performance measurements for one or more computer nodes in order to determine whether a number of one or more computing nodes on which a computation is able to be performed is sufficient.

U.S. Patent Application Publication No. 2018/0129495 A1 describes a method for managing software. In order to execute software, a manager sends a request containing a particular requirement, by way of which an optimum computer device for executing the software is intended to be ascertained. Following selection of the optimum computer device, the software is transmitted to the selected computer device for processing.

SUMMARY AND DESCRIPTION

The object on which the disclosure is based is then that of specifying a system and a method for reliably identifying and selecting computing nodes in a network or computing cluster that is distinguished by high reliability and security and allows improved resource planning and utilization of network systems and thus optimization thereof.

This object is achieved in terms of the systems and the methods disclosed herein. The scope of the present disclosure is defined solely by the appended claims and is not affected to any degree by the statements within this summary. The present embodiments may obviate one or more of the drawbacks or limitations in the related art.

According to a first aspect, the disclosure relates to a system for finding and identifying computing nodes in a network.

According to the disclosure, the probe is integrated into the software application and the scheduling module is suitable for dispatching the software application containing the probe to the computing nodes. If the probe identifies the suitability of a computing node, the execution of the software application may thus be started immediately.

In a further embodiment, the probe is configured independently of the software application and the scheduling module is suitable for dispatching only the probe to the computing nodes. The probe is thereby able to be dispatched to the various computing nodes more quickly, because it is not linked to the software application.

The probe advantageously contains a classification scheme with different categories for classifying the computing nodes, and the probe is configured to test the computing nodes by way of this classification scheme. It is thereby possible to quickly classify the tested computing nodes into an organization scheme.

According to one advantageous embodiment, the probe has a cleaning component for removing artefacts on the computing nodes.

The test code is advantageously configured to test the computing nodes within 10-100 milliseconds.

According to a further advantageous development, the scheduling module is suitable for executing different software applications based on the test results of the probe for the workload of the different software applications in an optimized sequence using different computing nodes.

According to a second aspect, the disclosure relates to a method for finding and identifying computing nodes in a network.

The probe is integrated into the software application and the scheduling module dispatches the software application containing the probe to the computing nodes. If the probe identifies the suitability of a computing node, the execution of the software application may thus be started immediately.

In a further embodiment, the probe is configured independently of the software application and the scheduling module dispatches only the probe to the computing nodes.

The probe is thereby able to be dispatched to the various computing nodes more quickly, because it is not linked the software application.

The probe advantageously contains a classification scheme with different categories for classifying the computing nodes, and the probe tests the computing nodes by way of this classification scheme. It is thereby possible to quickly classify the tested computing nodes into an organization scheme.

In a further embodiment, the probe has a cleaning component for removing artefacts on the computing nodes.

The test code advantageously tests the computing nodes within 10-100 milliseconds.

In a further embodiment, the scheduling module is suitable for executing different software applications based on the test results of the probe for the workload of the different software applications in an optimized sequence using different computing nodes.

According to a third aspect, the disclosure relates to a computer program product including one and/or more executable computer codes that is and/or are configured to perform a method according to one embodiment of the first aspect (for example, using a computer).

BRIEF DESCRIPTION OF THE DRAWINGS

The disclosure is explained in more detail below with reference to exemplary embodiments illustrated in the drawings.

DETAILED DESCRIPTION

Additional features, aspects, and advantages of the disclosure or its exemplary embodiments will become apparent through the detailed description in connection with the claims.

Figure 1:
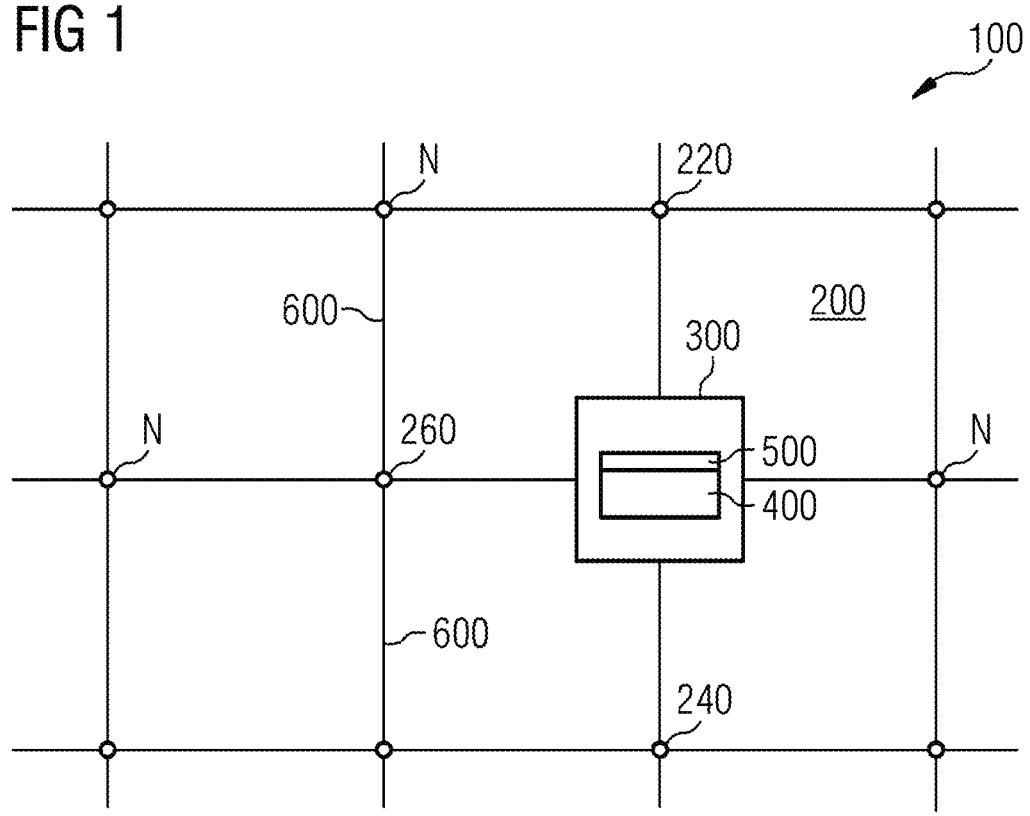
FIG. 1 depicts an overview for explaining a system according to an embodiment.

FIG. 1 depicts a system 100 for identifying and selecting computing nodes 220, 240, 260, ..., N in a network 200, with the computing nodes 220, 240, 260, ..., N being illustrated only by way of example here. The number N of computing nodes 220, 240, 260, ..., N may be of any size. The computing nodes 220, 240, 260, ..., N may contain edge devices having computer powers, routers, sensors with software modules, communication interfaces, or they may also be actuators, controllers, or other hardware devices that have the required computer power. The computing nodes 220, 240, 260, ..., N are networked with one another by way of communication connections 600 and may also be connected to one another by way of a cloud computing system, not illustrated in any more detail here. The network 200 may also constitute an industrial installation and/or a unit, (e.g., a building complex), which is monitored by at least some of the computing nodes 220, 240, 260, ..., N.

Some of the computing nodes 220, 240, 260, ..., N may thus constitute temperature sensors and smoke alarms that monitor rooms in a building.

The computing nodes 220, 240, 260, ..., N receive or generate data and process the data by way of software applications for particular applications. The software applications may be temporarily loaded in accordance with a respective task, or they are stored permanently in storage units in the respective computing node 220, 240, 260, ..., N.

A scheduling module 300 for executing a software application 400 is provided in the network 200 and is connected to the different computing nodes 220, 240, 260, ..., N. The software application 400 is however not processed in the scheduling module 300 itself, but rather in one of the computing nodes 220, 240, 260, ..., N in the network 200. For this purpose, however, it is necessary to identify an appropriate computing node N that performs the processing of the software application 400.

A relevant criterion for identifying suitable computing nodes N for a computational workload of a software application 400 may be the processor architecture of a computing node N, such as whether this is an ARM or an x86_64 processor, because the computing commands have to match the respective workload. The size of the available main memory, the size of the available storage space, the degree of CPU utilization and/or the quality and the current status of the network connectivity of the computing node N, (e.g., the bandwidth and the latency), are also indicators for selecting a computing node N. The real-time properties of the computing node N and of its operating system, and the specific hardware that is connected to the computing node N, such as sensors and actuators, may furthermore also play a role.

Figure 2:
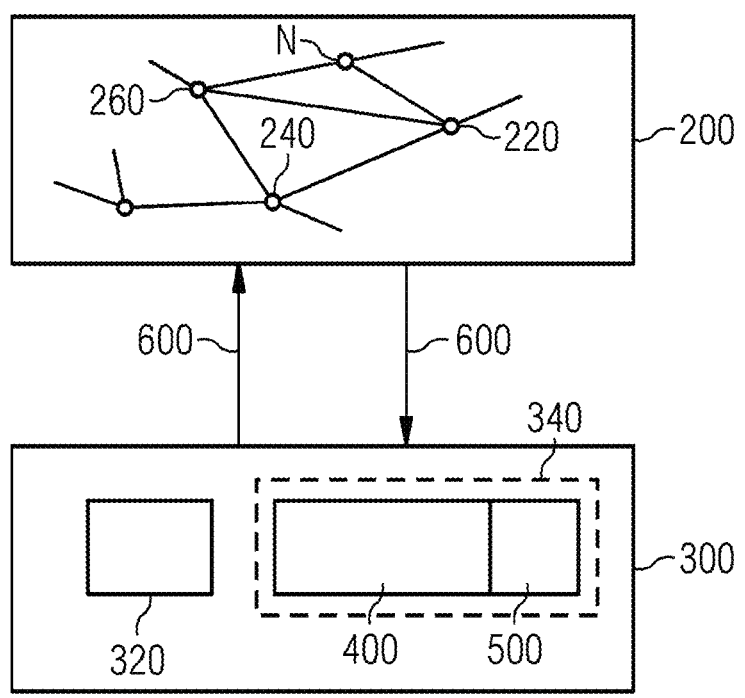
FIG. 2 depicts a block diagram for explaining an implementation detail of the system according to an embodiment.

FIG. 2 illustrates the scheduling module 300 in more detail. The schedule module may include a processor 320 and a storage element 340 in which the software application 400 and/or the binary workload are stored. The software application 400 and/or the binary workload is provided with a probe 500. The probe 500 is configured as software code and contains a test code 550 that has the following properties. The test code 550 is able to be booted in a very short time, (e.g., within a few milliseconds to seconds), because it has a short code length, and is injected into the network 200 in order to test the properties of potential computing nodes N. The code length may be very short and include, for example, 10-20 lines, but several hundred code lines may also be provided. Based on the test results, the test code 550 then independently suggests a computing node N or a plurality of computing nodes N in the network 200 on which the software application 400 is able to be executed. In this case, criteria such as a low effect on CPU performance, memory consumption and network traffic are in particular used.

The probe 500 furthermore also tests the availability of the required resources for a particular workload of the software application 400 in the network 200. If the resources are fundamentally not present, this is communicated to a communication center, not illustrated here, by way of a message. The check on the resources in the network 200 is advantageously concluded very quickly, for example, within a few milliseconds to a few seconds. In some cases, this may however take several minutes.

The probe 500 furthermore has a cleaning component 570 for cleaning the computing node N such that no artefacts remain on the computing node N on which the test is executed by the probe 500. This may involve software libraries, memory entries, and/or configuration files. If the probe 500 indicates a positive result, this means that a computing node N is suitable for a particular computing load caused by a software application 400. The probe 500 may furthermore also store codes, etc., on the computing node N or deposit them there, these codes being necessary to execute the software application on the computing node N or being necessary to schedule subsequent execution on the computing node N.

Figure 3:
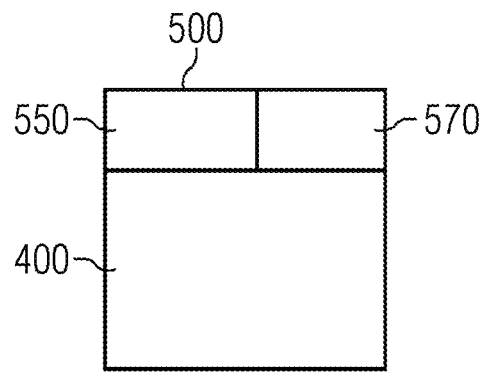
FIG. 3 depicts a block diagram for explaining a further optional implementation detail of the system according to an embodiment.

As illustrated in FIG. 3, the probe 500 may be present directly in the software application 400 and also have the same data format, such that the probe 500 is dispatched into the network 200 together with the software application 400.

Figure 4:
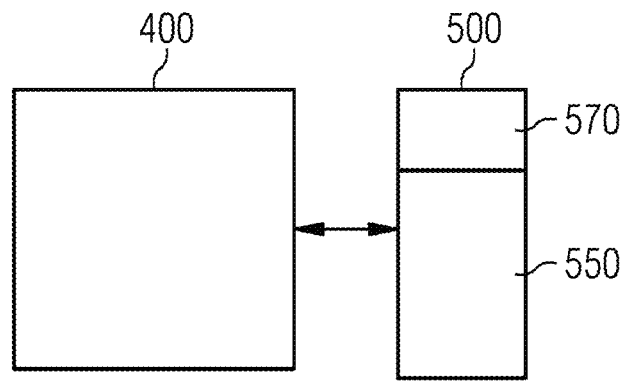
FIG. 4 depicts a block diagram for explaining a further optional implementation detail of the system according to an embodiment.

If the workload binary files are of a size such that distributing them in the network 200 has considerable effects on the performance of the entire network 200, an implementation may also take place such that the probe 500 containing the test code 550 is separated from the actual binary code of the workload of the software application 400. This is illustrated in FIG. 4. Because the test code 550 is configured as a small software element, it is able to be distributed in the network 200 with little effort, and the binary code for a large workload is provided only for the computing nodes N that indicated a positive result when executing the test code 550.

Furthermore, in one development, provision may be made to expand the probe 500 or the test code 550 with a classification scheme. The probe 500 may contain classification parameters or categories in order to be able to use them for different software applications 400 that differ in terms of the required computing power for the processing. Examples of classification parameters may be: computing nodes N have to have a particular processor architecture; computing is performed by way of a CPU that has a minimum or maximum number of CPU cores; a computing node N has to have at least a particular amount of freely available (e.g., main) memory space; a computing node N has to have a particular hardware feature, (e.g., a real-time clock); or a computing node has to be connected to particular hardware, (e.g., a sensor).

As illustrated in FIG. 2, the scheduling module 300 transmits the probe 500 to the computing nodes 220, 240, 260, . . . , N in the network 200. After the probe 500 has tested the computing nodes 220, 240, 260, . . . , N by way of the test code 550, the test code 550 or the probe 500 communicates the test results to the scheduling module 300. The test results contain the information about the status of the computing nodes N. The test results may also include further information. Functional elements may be provided in the scheduling module 300 and called by the test code 550 according to the respective test result, such that the scheduling module 300 is informed of the test results through these function calls.

If processing of a software application 400 and thus use of computing power is then scheduled in the network 200, the scheduling module 300 checks whether the processing fits into one or more processing categories for which tests have already been performed in the network 200 by the probe 500 in accordance with the defined classification parameters of the probe 500. Processing or executing a software application may thus require the following prerequisites: At least one dual-core processor is required at a computing node N, 256 MB of storage capacity are additionally required in an available working memory, and 1 GB of storage capacity is required in an available hard drive memory.

A test performed beforehand by way of the probe 500 identified potentially suitable computing nodes N having the following specifications: At least one quad-core processor, 512 MB of storage capacity in an available working memory, and 1 GB of storage capacity in an available hard drive memory are present.

In such a case constellation, the scheduling module 300 may schedule the new computing utilization without having to transmit a new probe 500 into the network 200. If the required computing power does not however fit into one of the categories for which a test was executed beforehand by way of the probe 500, the scheduling module 300 performs a new test with regard to the available computing power in the computing nodes N in the network 200.

It is furthermore possible for a required computing power to be classified for a particular execution of a software application, but for the workload of this software application to have further additional individual requirements that are not able to be classified into a predetermined category. In this case, the scheduling module 300 may perform the workload test only on computing nodes N that already fall into the already classified category.

Tests with regard to the execution capacities of computing notes N for a workload are thus performed by way of a probe 500, wherein the computing nodes N are arranged in a heterogenous network 200 and have different properties and degrees of utilization. Provision is furthermore made for a classification scheme for a workload that simplifies the ability to schedule the execution of a software application on different computing nodes N.

It is thereby possible to avoid using unsuitable computing nodes N to execute a software application. Unsuitable computing nodes N lead to loading of the network 200 and to extra expenditure until a suitable computing node N for a workload is able to be identified. Unintentionally executing a workload on an unsuitable computing node N may also lead to damage, because a real-time task on a computing node N may be negatively influenced when this computing node is already being used to capacity by another computing task.

The probe 500 also offers the possibility of reliably finding suitable computing nodes N for a workload quickly and with little effort. The degree of utilization of the network 200 is optimized overall by virtue of workloads being classified and documentation with regard to the test results being performed for different workload categories. This documentation may be stored in the scheduling module 300.

Furthermore, it is also possible for the probe 500 containing the test code 550 to be transmitted only to a selection of computing nodes N that have already, for example, been defined by developers and operators. The scheduling module 300 then performs an assignment between the predetermined computing nodes N and the workload categories and the workload is executed only on the computing nodes N that are taken into consideration based on this assignment.

Figure 5:
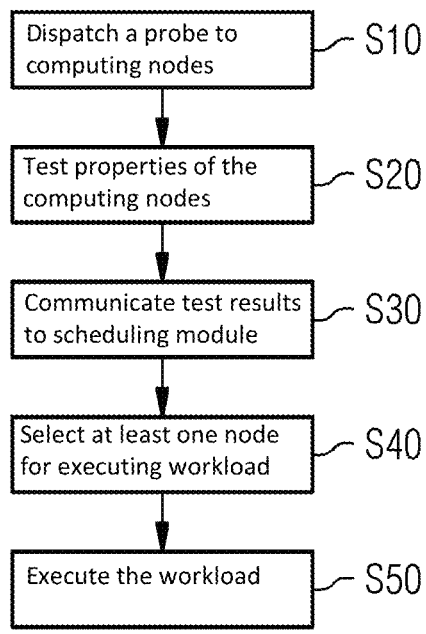
FIG. 5 depicts a flowchart for explaining a method according to an embodiment.

FIG. 5 depicts a flowchart of a method for identifying computing nodes N for processing a workload in a network 200.

In act S10, the scheduling module 300 dispatches a probe 500 to computing nodes 220, 240, 260, . . . , N of the network 200, with the probe 500 containing a test code 550 for testing the properties of the computing nodes 220, 240, 260, . . . , N.

In act S20, the test code 550 of the probe 500 tests the properties of the computing nodes 220, 240, 260, . . . , N with regard to their ability to execute a particular workload of at least one software application 400.

In act S30, the test code 550 communicates the test results to the scheduling module 300.

In act S40, the scheduling module 330, based on the test results of the test code 550, selects one or more computing nodes N for executing a workload of at least one software application 400.

In act S50, the scheduling module 300 starts executing the workload of the at least one software application 400 on the selected computing node N.

Figure 6:
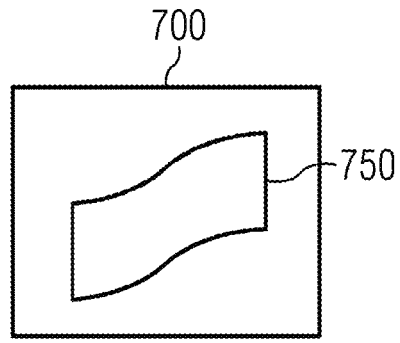
FIG. 6 depicts a schematic illustration of a computer program product according to an embodiment.

FIG. 6 schematically illustrates a computer program product 700 that contains one and/or more executable computer codes 750 that is and/or are configured to perform a method as disclosed herein (for example, using a computer).

By virtue of the present disclosure, it is thus possible to identify suitable computing nodes N for a particular workload of a software application in a network 200 including computing nodes 220, 240, 260, . . . , N. It is thereby possible, in the network 200 and in a targeted manner, to select computing nodes N that are suitable for executing a workload, and it is thus possible to avoid overloading of the network 200.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described with respect to certain embodiments, equivalents and modifications will occur to others skilled in the art upon the reading and understanding of the specification. The present disclosure includes all such equivalents and modifications and is limited only by the scope of the appended claims.

LIST OF REFERENCE SIGNS 100 system
200 network
220 computing node
240 computing node
260 computing node
300 scheduling module
320 processor
340 memory
400 software application
500 probe
550 test code
570 cleaning component
600 communication connections
700 computer program product
750 computer code

The invention claimed is:

1. A system for finding and identifying computing nodes in a network, the system comprising:
a network having computing nodes connected to one another by way of communication connections, wherein the computing nodes are configured to execute a workload of one or more software applications; and
at least one scheduling module having at least one probe comprising a test code, wherein the at least one scheduling module is configured to dispatch the at least one probe comprising the test code to the computing nodes of the network in order to test properties of the computing nodes,
wherein the test code is configured to test the properties of the computing nodes in terms of an ability of the computing nodes to execute a particular workload of at least one software application,
wherein the test code is configured to communicate test results to the at least one scheduling module,
wherein the at least one scheduling module is configured, based on the test results of the test code, to select at least one computing node of the computing nodes to execute the workload of the at least one software application, and to start the execution of the workload of the at least one software application on the at least one selected computing node,
wherein the at least one probe is integrated into the at least one software application,
wherein the at least one scheduling module is configured to dispatch the at least one software application containing the at least one probe to the computing nodes,
wherein the at least one probe comprises a classification scheme with different categories for classifying the computing nodes,
wherein the at least one probe is configured to test the computing nodes by way of the classification scheme,
wherein the different categories of the classification scheme are configured to be used for the one or more software applications that differ in terms of required computing power for processing, and
wherein the different categories of the classification scheme comprise a particular processor architecture, a minimum number of central processing unit (CPU) cores, a maximum number of CPU cores, a minimum amount of freely available main memory space, a particular hardware feature, a connection to a particular hardware, or a combination thereof.

2. The system of claim 1, wherein the at least one probe is configured independently of the at least one software application, and
wherein the at least one scheduling module is configured to dispatch only the at least one probe to the computing nodes.

3. The system of claim 1, wherein the at least one probe has a cleaning component for removing artefacts on the computing nodes.

4. The system of claim 1, wherein the test code is configured to test the computing nodes within 10-100 milliseconds.

5. The system of claim 1, wherein the at least one scheduling module is configured to execute different software applications based on the test results of the at least one probe for the workload of the different software applications in an optimized sequence using different computing nodes of the computing nodes.

6. The system of claim 1, wherein the particular hardware feature is a real-time clock.

7. The system of claim 1, wherein the particular hardware is a sensor.

8. The system of claim 1, wherein the at least one probe stores the test code on the computing nodes.

9. A method for finding and identifying computing nodes in a network, the network comprising computing nodes connected to one another by way of communication connections and configured to execute a workload of one or more software applications, and at least one scheduling module having at least one probe comprising a test code, the method comprising:
- transmitting, by the at least one scheduling module, the at least one probe comprising the test code to the computing nodes of the network in order to test properties of the computing nodes;
- testing, by the test code, the properties of the computing nodes in terms of an ability of the computing nodes to execute a particular workload of at least one software application;
- communicating, by the test code, test results to the at least one scheduling module;
- selecting, by the at least one scheduling module, at least one computing node of the computing nodes to execute the workload of the at least one software application based on the test results of the test code; and
- starting, by the at least one scheduling module, an execution of the workload of the at least one software application on the at least one selected computing node,
- wherein the at least one probe is integrated into the at least one software application,
- wherein the scheduling module dispatches the at least one software application containing the at least one probe to the computing nodes,
- wherein the at least one probe comprises a classification scheme with different categories for classifying the computing nodes,
- wherein the at least one probe is configured to test the computing nodes by way of the classification scheme,
- wherein the different categories of the classification scheme are used for the one or more software applications that differ in terms of required computing power for processing, and
- wherein the different categories of the classification scheme comprise a particular processor architecture, a minimum number of central processing unit (CPU) cores, a maximum number of CPU cores, a minimum amount of freely available main memory space, a particular hardware feature, a connection to a particular hardware, or a combination thereof.

10. The method of claim 9, wherein the at least one probe is configured independently of the at least one software application, and
- wherein the at least one scheduling module dispatches only the at least one probe to the computing nodes.

11. The method of claim 9, wherein the at least one probe comprises a cleaning component for removing artefacts on the computing nodes.

12. The method of claim 9, wherein the test code tests the computing nodes within 10-100 milliseconds.

13. The method of claim 9, wherein the at least one scheduling module executes different software applications based on the test results of the at least one probe for the workload of the different software applications in an optimized sequence using different computing nodes of the computing nodes.

14. A non-transitory computer program product stored in a network comprising computing nodes connected to one another by way of communication connections and configured to execute a workload of one or more software applications, and at least one scheduling module having at least one probe, wherein the non-transitory computer program product comprises code that, when executed, causes the network to:
- transmit, by the at least one scheduling module, the at least one probe comprising a test code to the computing nodes of the network in order to test properties of the computing nodes;
- test, by the test code, the properties of the computing nodes in terms of an ability of the computing nodes to execute a particular workload of at least one software application;
- communicate, by the test code, test results to the at least one scheduling module;
- select, by the at least one scheduling module, at least one computing node of the computing nodes to execute the workload of the at least one software application based on the test results of the test code; and
- start, by the at least one scheduling module, an execution of the workload of the at least one software application on the at least one selected computing node,
- wherein the at least one probe is integrated into the at least one software application,
- wherein the scheduling module dispatches the at least one software application containing the at least one probe to the computing nodes,
- wherein the at least one probe comprises a classification scheme with different categories for classifying the computing nodes,
- wherein the at least one probe is configured to test the computing nodes by way of the classification scheme,
- wherein the different categories of the classification scheme are configured to be used for the one or more software applications that differ in terms of required computing power for processing, and
- wherein the different categories of the classification scheme comprise a particular processor architecture, a minimum number of central processing unit (CPU) cores, a maximum number of CPU cores, a minimum amount of freely available main memory space, a particular hardware feature, a connection to a particular hardware, or a combination thereof.

* * * * *